(12) United States Patent
Cornell et al.

(10) Patent No.: US 6,667,710 B2
(45) Date of Patent: Dec. 23, 2003

(54) 3-D WEATHER BUFFER DISPLAY SYSTEM

(75) Inventors: Bill G. Cornell, Bellevue, WA (US); Roland Y. Szeto, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/080,197

(22) Filed: Feb. 19, 2002

(65) Prior Publication Data

US 2003/0001770 A1 Jan. 2, 2003

Related U.S. Application Data

(60) Provisional application No. 60/301,864, filed on Jun. 29, 2001, provisional application No. 60/306,925, filed on Jul. 19, 2001, and provisional application No. 60/306,488, filed on Jul. 18, 2001.

(51) Int. Cl.[7] .............................. G01S 7/04; G01S 13/95
(52) U.S. Cl. ........................ 342/26; 342/89; 342/175; 342/176; 342/179; 342/180; 342/195
(58) Field of Search .............................. 342/25, 26, 89, 342/90–93, 118, 175, 176–186, 195

(56) References Cited

U.S. PATENT DOCUMENTS

| 4,940,987 A | 7/1990 | Frederick |
| 5,059,967 A | 10/1991 | Roos |
| 5,202,690 A | 4/1993 | Frederick |
| 5,331,330 A | 7/1994 | Susnjara |
| 5,699,067 A | 12/1997 | Brown et al. |
| 5,781,146 A | 7/1998 | Frederick |
| 5,828,332 A | 10/1998 | Frederick |
| 5,920,276 A | 7/1999 | Frederick |
| 6,043,756 A | * 3/2000 | Bateman et al. ............... 342/26 |
| 6,184,816 B1 | 2/2001 | Zheng et al. |
| 6,212,132 B1 | * 4/2001 | Yamane et al. ............. 367/180 |

* cited by examiner

Primary Examiner—Bernarr E. Gregory
(74) Attorney, Agent, or Firm—Honeywell International Inc.

(57) ABSTRACT

The present invention comprises a system, method, and computer program product for generating various weather radar images. A weather radar display system includes a database, a display, and a display processor coupled to the database and the display. The display processor includes a first component configured to store radar return data in a three-dimensional buffer in the database based on aircraft position information, a second component configured to extract at least a portion of the data stored in the three-dimensional buffer based on aircraft position information, and a third component configured to generate an image of the extracted return data for presentation on the display.

35 Claims, 7 Drawing Sheets

3-D WEATHER BUFFER DISPLAY SYSTEM

This application claims priority from copending U.S. Provisional Patent Application No. 60/301,864, filed Jun. 29, 2001, and from copending U.S. Provisional Patent Application No. 60/306,925, filed Jul. 19, 2001, and from copending U.S. Provisional Patent Application No. 60/306,488, filed Jul. 18, 2001.

This invention relates to copending applications U.S. patent application Ser. No. 10/079,477, U.S. patent application Ser. No. 10/080,180, and U.S. patent application Ser. No. 10/080,192, all filed on Feb. 19, 2002.

BACKGROUND OF THE INVENTION

In present-day aircraft radar systems, a single sweep of radar data is collected and displayed on a display for the pilot. Because only a single sweep of radar data is being displayed, large amounts of space are not being examined at all. This unexamined space may contain weather hazards.

Some systems have attempted to allow a pilot to simultaneously view weather information from various regions of space. For example, U.S. Pat. Nos. 4,940,987; 5,202,690; 5,781,146; 5,828,332; and 5,920,276, to Fredrick present storing radar return data into a three-dimensional array that is apparently based on the tilt of the radar. '987 presents generating a plan view that is selected according to tilt. The plan view image displays a span over a range of altitudes. Therefore, in order for a pilot to determine if an altitude above or below the aircraft's present altitude is clear of any weather hazards, the pilot must shift their visual focus to a vertical front or side view image. Fredrick also fails to present a full plan view-radar return data not in the present radar scan. In Fredrick, it is impossible to determine when the displayed radar return data was scanned, thus, possibly displaying old, erroneous data.

Also, with respect to Fredrick, radar return data may be erroneously stored in memory due to stabilization errors of the radar system. When radar return data is stored in error, the resulting pilot display will contain inaccuracies.

Therefore, there exists a need to provide pilots with easily interpretable, accurate, and timely radar display information.

SUMMARY OF THE INVENTION

The present invention comprises a system, method, and computer program product for generating various weather radar images. A weather radar display system includes a database, a display, and a display processor coupled to the database and the display. The display processor includes a first component that stores radar return data in a three-dimensional buffer in the database based on aircraft position information, a second component that extracts at least a portion of the data stored in the three-dimensional buffer based on aircraft position information, and a third component that generates a image of the extracted return data for presentation on the display.

In accordance with further aspects of the invention, the first component stores the radar return data with time information and the third component generates an image according to the stored time information.

In accordance with other aspects of the invention, the third component generates display objects based on a first color or shade/intensity, if time information associated with the return data is within a first pair of threshold values. Also, the third component generates display objects based on a second color or shade/intensity, if the time information associated with the return data is within a second pair of threshold values.

In accordance with still further aspects of the invention, the three-dimensional buffer is aircraft referenced in x and y and an altitude dimension is referenced to altitude above the earth and the first component translates the radar return data into the coordinate system of the three-dimensional buffer.

In accordance with yet other aspects of the invention, the first component stores radar return data based on atmospheric affects of radar.

In accordance with still another aspect of the invention, the first component stores return data based on actual radar tracking or antenna pointing.

As will be readily appreciated from the foregoing summary, the invention provides an improved weather radar display system.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
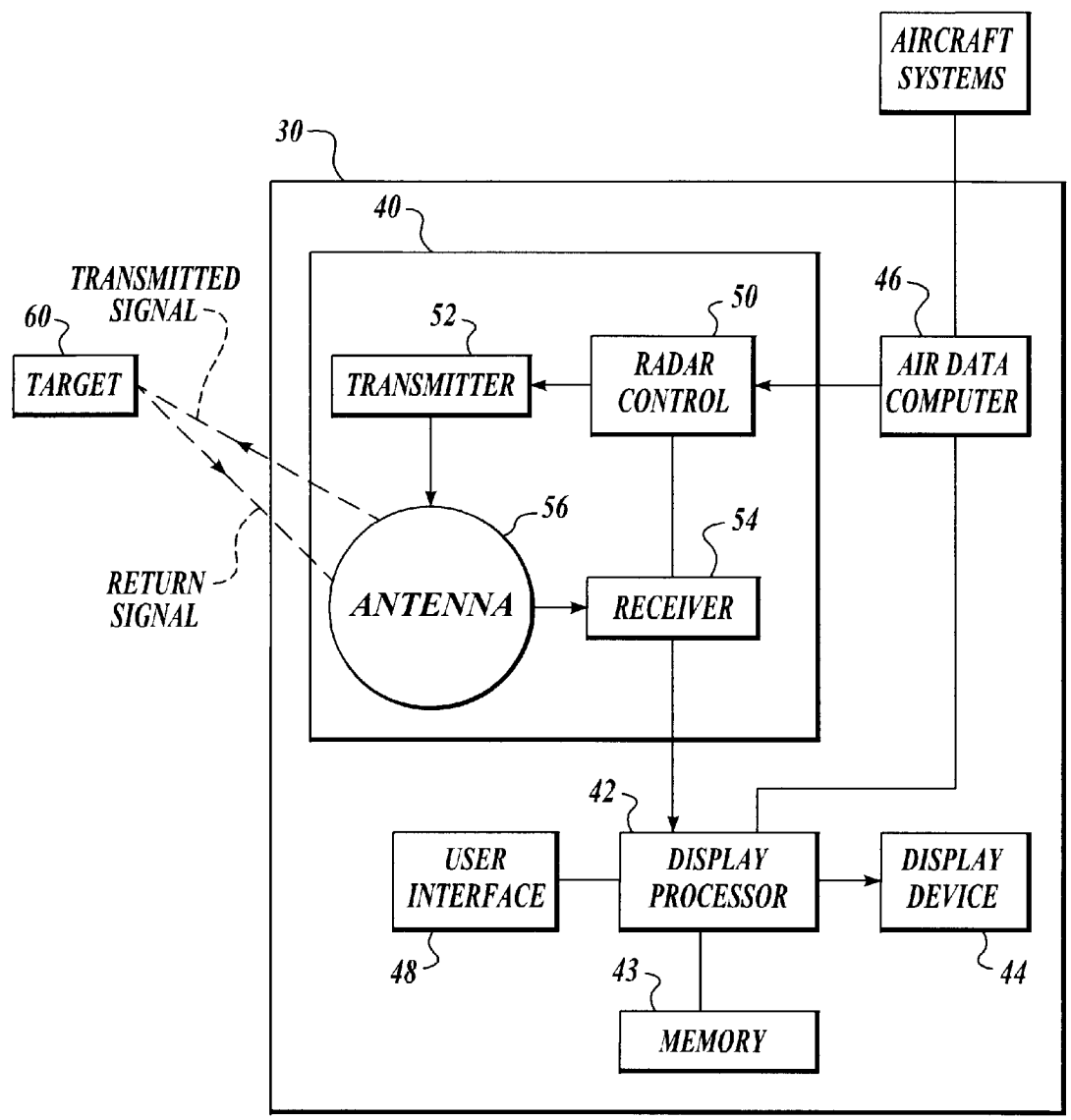
FIG. 1 is a block diagram illustrating components of the present invention.

The present invention is a system, method, and computer program product for providing improved radar return data storage, and display of the stored radar return data. FIG. 1 illustrates an example system 30 formed in accordance with the present invention. The system 30 includes a weather radar system 40, a display processor 42, memory 43, a display device 44, an air data computer 46, and user interface 48 coupled to the display processor 42. The display processor 42 is electrically coupled to the radar system 40, the display device 44, the air data computer 46, and the memory 43. An example of the radar system 40 includes a radar controller 50 (coupled to the user interface 48), a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the air data computer 46, a Flight Management System (FMS), Inertial Navigation System (INS), and/or a global positioning system (GPS). The air data computer 46 generates air data based on signals received from various aircraft flight systems. The radar system 40 transmits radar signals from the antenna 56 into space and receives return signals, if a target 60 is contacted by the transmitted radar signal. Preferably, the radar system 40 creates reflectivity values by basing the return signals on range, altitude, and other radar factors. The reflectivity values are sent to the display processor 42. The display processor 42 translates the received reflectivity values for storage in a three-dimensional buffer in the memory 43. The display processor 42 then generates an image for presentation on the display device 44 based on any control signals sent from the user interface 48 or based on settings within the processor 42. U.S. Pat. No. 5,059,967 to Roos describes an apparatus and method for displaying weather information and is hereby incorporated by reference.

The translated reflectivity values or return data, as determined by the radar system 40 or processor 42, identify certain weather targets, such as rain/moisture, windshear, or turbulence. The type of weather target identified is based on a corresponding present algorithmic interpretation of the reflectivity values. The pilot selects the type of weather identified using the user interface 48.

Figure 2:
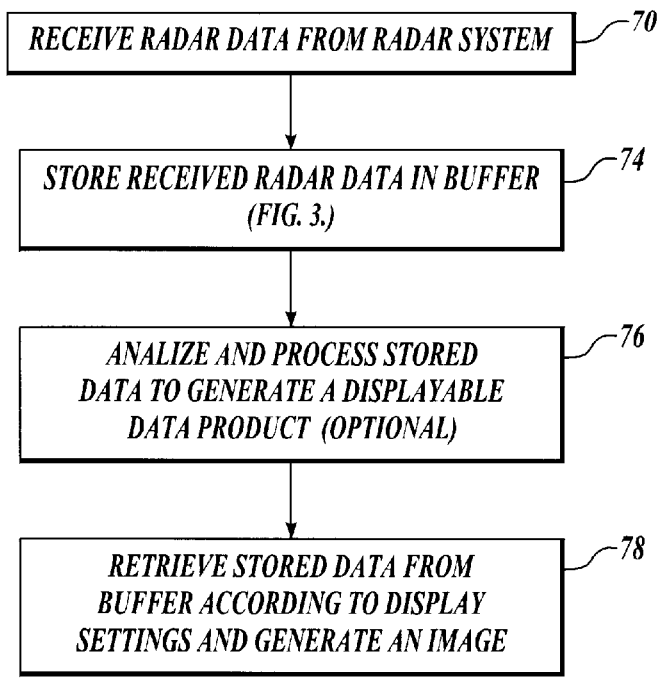
FIGS. 2 and 3 are flow diagrams illustrating processes performed by the system shown in FIG. 1.

FIG. 2 illustrates an example process performed by the display processor 42 shown in FIG. 1. First, at block 70, the processor 42 receives data from the radar system 40 that includes radar return data and time information of multiple radar sweeps. Next, at block 74, the processor 42 stores the received data in a three-dimensional buffer based on the current aircraft position supplied by the air data computer 46, FMS, INS, or GPS. Finally, at block 78, the processor 42 retrieves data from the three-dimensional buffer based on a display signal sent by the user interface 48 or preset within the processor 42. The retrieval of data from the three-dimensional buffer is preferably based on aircraft flight data received from the air data computer 46. The retrieval of data from the three-dimensional buffer can be an analysis and processing of the data that generates a data product, such as an icon or feature display object, see optional block 76 between block 74 and 78.

Figure 3:
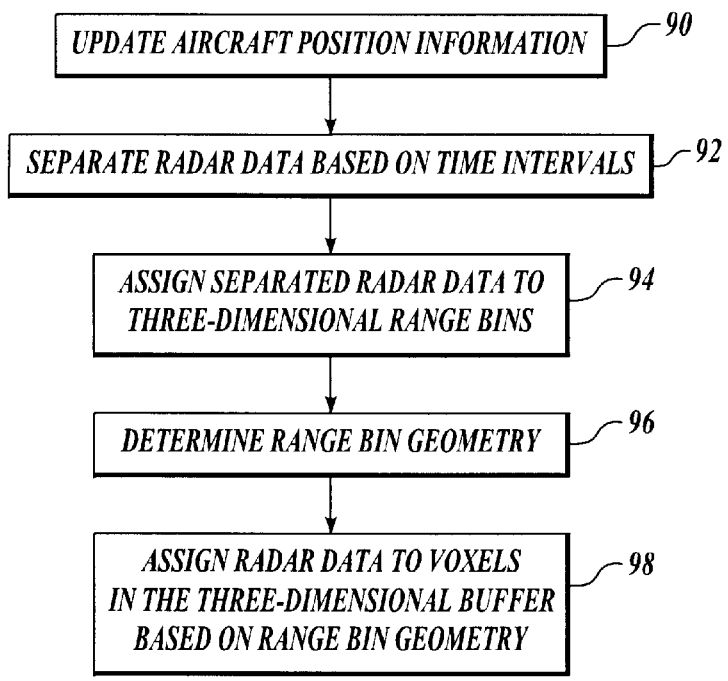

FIG. 3 illustrates the process of storing received radar return data into the three-dimensional buffer. This process illustrates how the return data associated with a single radar signal is inserted into the three-dimensional buffer. First, at block 90, the current position of the aircraft is updated. Next, at block 92, radar data is separated into units based on time intervals. At block 94, each separated unit of radar data is assigned to a three-dimensional range bin. Then, at block 96, the geometry, in the coordinate system of a three-dimensional buffer with voxels, of each range bin is determined based on aircraft position, and radar tilt information. Next, at block 98, all the voxels in the three-dimensional buffer that correspond to the determined range bin geometry are assigned the radar data (reflectivity value) in the units that were assigned to the corresponding range bin based on current aircraft position. Also, each voxel is assigned a time value as to when it was most recently updated with the associated range bin information. In one embodiment, only the most recent radar data is stored in the voxel. In another embodiment, radar data from multiple times is stored. In this embodiment, several features can be added to the buffer, such as Time History Animation and Storm Trending. The following describes range bins in more detail. The radar signal transmitted from the antenna 56 is radiated into space with a beam width that is a function of antenna size. The return radar signal of the radiated radar signal includes a number of reflectivity values separated in time or, in other words, a continuous reply signal translated into voltage values that identify target intensities. Time corresponds to distance from the aircraft. Each unit of time is considered a range bin and each range bin is assigned a volume of space based on the fact that the return signal received by the antenna 56 of the radar system 40 is the reflectivity value received from a volume of space some distance from the aircraft. In one embodiment, the present invention uses a two-dimensional rectangular shape to define each range bin in order to simplify the math and perform processing in real-time when assigning the corresponding reflectivity value to the three-dimensional buffer voxels. The size of either a two or three-dimensional range bin is based on voxel size, desired resolution, and other radar and display factors. As will be shown in more detail below, the return radar signals are a result of overlapping transmitted radar signals. For simplicity, the present invention assigns the reflectivity values to non-overlapping range bins/rectangular blocks.

Figure 4:
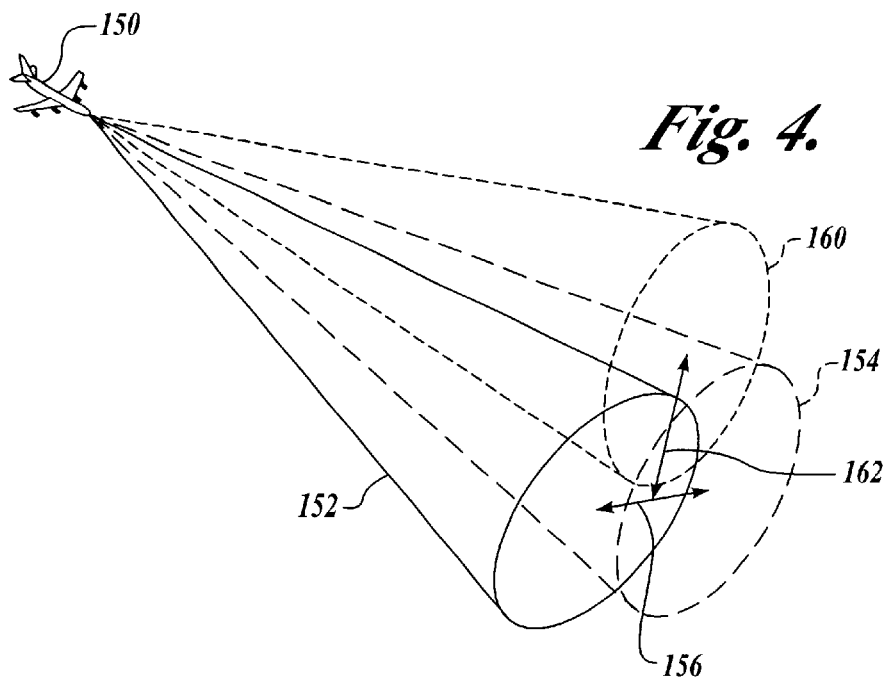
FIG. 4 is a perspective diagram of volumes of scanned space scanned by multiple radar signals emanating from an aircraft.

FIG. 4 illustrates a perspective view of an aircraft 150 emanating three radar signals contained in conical volumes of space 152, 154, and 160 along different radials. The radar signals in conical volume 152 and 154 are along the same azimuth of the radar antenna and are overlapped according to an azimuth sample interval 156 identified as the separation between the centers of the volumes 152 and 154. The volume 160 illustrates a radar signal at a tilt sample interval 162 from the adjacent tilt sweep identified by volumes 152 and 154. For example, with a 30" antenna, a 1° azimuth sample interval 156 and a 0.5°–3.0° tilt sample interval 162 are used. The radar scan of the antenna is preferably executed in sweeps that are parallel to a horizon line, but could be performed vertically or by some other pattern.

In an alternate embodiment, a terrain map (not shown) with elevation data is used for ground clutter reduction. The terrain map has a resolution similar to the three-dimensional buffer. The terrain map is preferably organized as a two-dimensional circular buffer similar to a single layer of the buffer. During each range bin insertion into the buffer, the altitude of the lower edge of the bin or radar beam is used to compare with the elevation data stored in the terrain map at the same ground location. For example in a 30" antenna, a −2.25° offset from the center tilt setting or tilt bias is used as the lower edge value. Tilt settings and biases can be adaptive to adjust to varying signal environments, pilot references, and other factors. If the altitude is at or below the elevation, part or all of the range bin, and in turn corresponding voxels, are tagged as ground contaminated.

Figure 5:
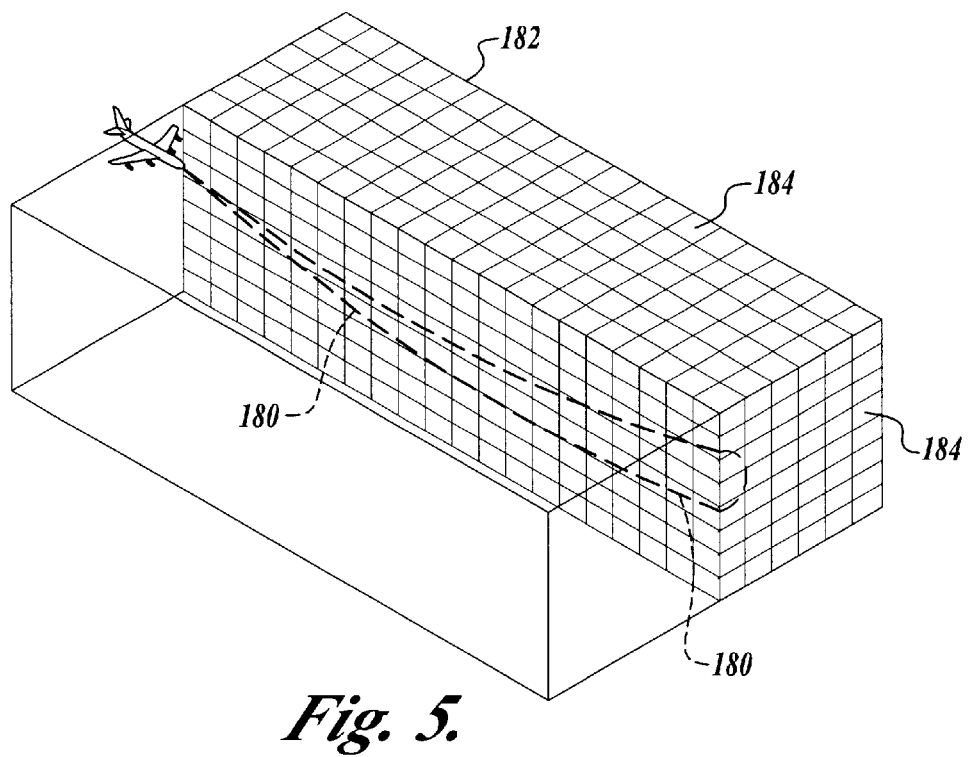
FIG. 5 is an abstract perspective diagram of how return from a single radar signal along a radial is mapped into a three-dimensional buffer.

In one embodiment of the present invention, the three-dimensional buffer is relational to the earth. The x, y, z coordinates of the buffer correspond to x, y, z positions at some altitude above 0 ft Mean Sea Level (MSL). Therefore, because radar return data is not relational to the earth, the radar return data must be translated according to the earth's curvature for proper entry into the three-dimensional buffer. As shown in FIG. 5, when radar return data shown in volume 180 is translated into the three-dimensional buffer 182 or, in other words voxels 184 within the three-dimensional buffer 182 are assigned values (i.e., reflectivity measurement (dBz)) from the radar return data of the volume 180, the volume 180 occupied by the radar return data must be curved in order for the return data to be stored at the correct location relative to the earth.

In one embodiment, the three-dimensional buffer is a circular buffer. Once data from a range bin is inserted into the buffer, the data does not have to be copied again when the aircraft moves. Motion compensation of existing data is achieved by the simple act of moving the position reference of the aircraft relative to the buffer.

Figure 6:
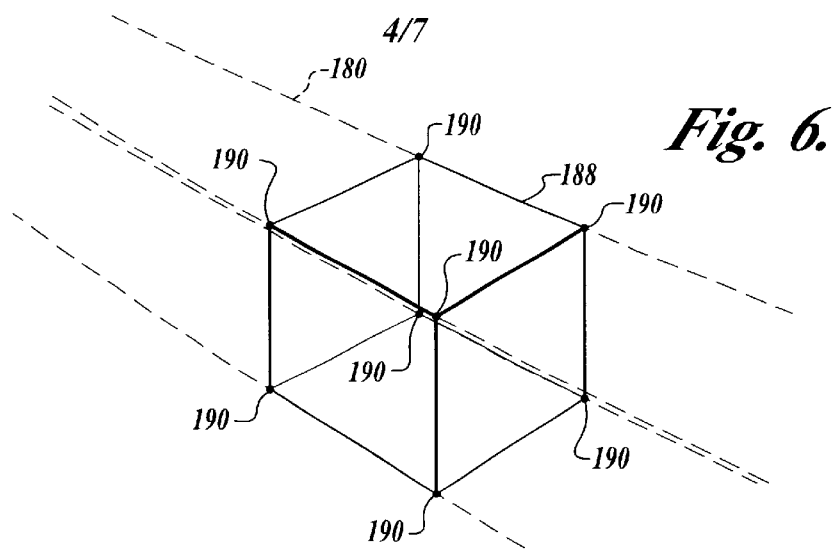
FIG. 6 is a perspective diagram of a single range bin that contains radar return data and a corresponding portion of voxels of the three-dimensional buffer.

FIG. 6 illustrates a range bin 188 of the radar return data volume 180 from FIG. 5. In order to store the radar return data into the proper voxels, coordinates 190 of each range bin must be found in the three-dimensional buffer coordinate system.

Figure 7:
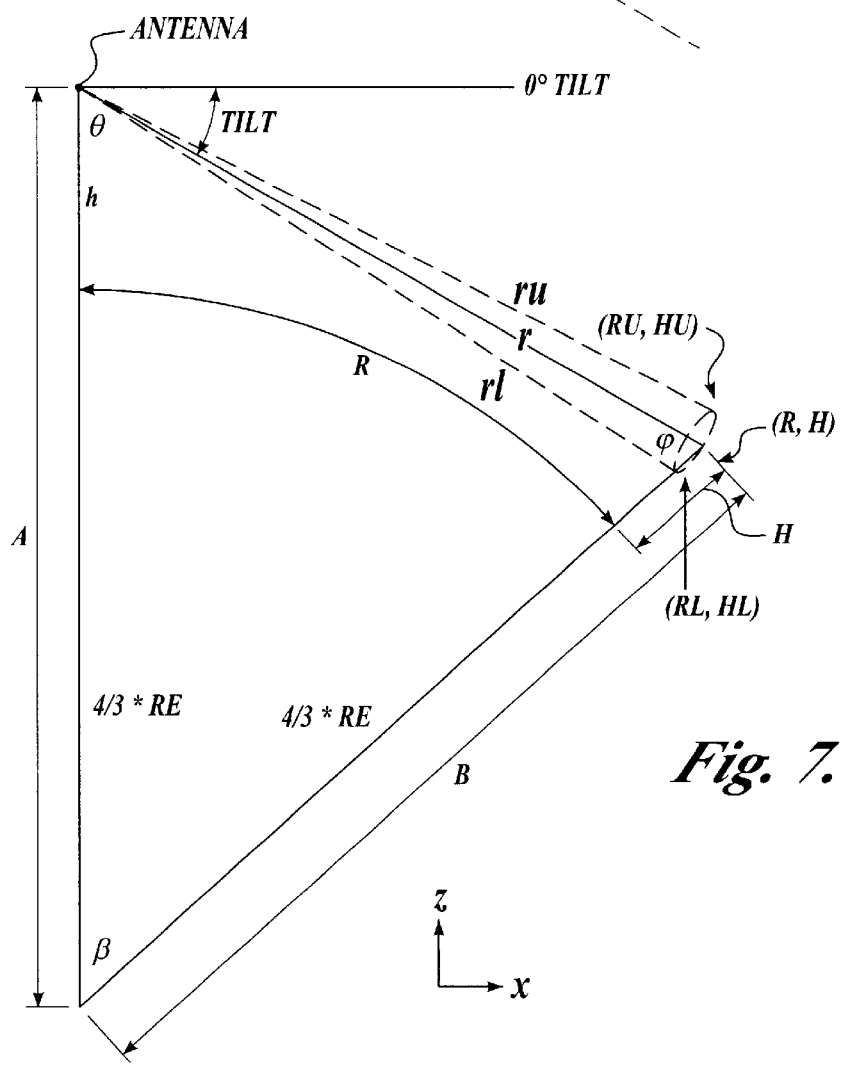
FIG. 7 is a geometric diagram for defining the boundaries of range bins relative to the coordinate system of the three-dimensional buffer.

FIG. 7 illustrates the geometrical relationships required by the following equations for correcting range bin radar return data for the earth's curvature. Given the aircraft altitude (h) above the earth's surface (referenced to MSL), an antenna tilt value, and a slant range (r) along the path of the radar signal:

$$\theta = \pi/2 + \text{tilt}$$

$$A = 4/3 * RE + h$$

$$B^2 = r^2 + A^2 - 2*r*A*\cos(\theta)$$

$$H = B - 4/3*RE$$

$$\sin(\beta) = r*\sin(\theta)/B$$

$$R = \beta*(B-H) = \beta*4/3*RE$$

$$\pi = \theta + \beta + \phi$$

RE=Radius of the Earth

The above equations use radians for angular measurement and nautical miles for length. In this embodiment, a 4/3 earth model is used as the effective earth radius to correct for the curvature of radar rays due to atmospheric refraction in a normal atmosphere (*Radar Handbook by Merrill Skolnik*).

A ½ radar radar beamwidth angle is added to the tilt to come up with a line for finding the points for the upper edge and the lower edge of a range bin. Since each range bin is small (radius of curvature of the bin is large relative to the range depth of the bin), for real-time processing contraints, the edges of the range bin are approximated by straight lines. In one embodiment, the lower beam edge is taken to be y° below the antenna tilt, the upper beam edge is x° above the lower edge where x° is the delta increment to the next tilt as determined by the scan strategy of the radar system. This is optimized to minimize ground return, and to minimize the effect of a radar signal beam width extending a storm to a much higher altitude than is actually occurring. The width of the range bin is a function of radar parameters and is centered on the azimuth reading of the radial.

Since the ground range and altitude computation is independent of antenna azimuth, the results can be saved for use for other range bins in a single horizontal sweep of the antenna. Further, if the range bins are non-overlapping and touching between tilt steps, the determined upper edge of the range bins in one sweep becomes the lower edge of the range bins in the subsequent sweep. The range bins used were chosen in order to meet real-time processing requirements.

Given an antenna azimuth value (az), the antenna tilt, the aircraft heading (hd), the aircraft location in the three-dimensional buffer space (x0, y0, z0) as received from the air data computer 46, FMS, INS, or comparable source, and a horizontal radar beam width (bwh), the corner points (x, y, z) for the range bin are computed based on the geometrical relationships shown in FIG. 7.

The resolution of the three-dimensional buffer depends upon a number of factors including the geometry and parameters of the transmitted radar signals and the detail of information desired for presentation on the display device. For example, for a 3° radar beam width (3 dB beam width), the width of a range bin at approximately 10, approximately 100, and approximately 350 (the maximum display range currently supported) nautical miles (nm) from the antenna are about 0.3, 4, and 17 nm respectively. Therefore, in one embodiment for conserving memory and computational time for the translation of range bin information into the three-dimensional buffer coordinate system and assignment to voxels, two or more buffers of different resolution are used for storing associated reflectivity values. For example, a first short range buffer is used to store data up to 80 nm from the aircraft. A second long range buffer stores data up to 320 nm from the aircraft.

In one embodiment, the minimum horizontal size of the three-dimensional buffer is 2*(range+delta) where delta is the amount of aircraft movement before the buffer is overwritten, such as when the buffer is a circular buffer. For example, based on a speed of 600 knots, 10 nm is chosen as the delta, so that the buffer cannot wrap around in less than one minute. Otherwise, there is a possibility that data behind the aircraft is displayed as being in front of the aircraft since multiple points will be mapped to the same buffer location.

Since there is a common area between the first and second buffers, data in the 80 nm buffer can be replicated into the 320 nm buffer during insertion. The short range buffer collects data out to 90 nm, and the long range buffer collects data out to 330 nm. The additional distance in each buffer is used to provide data between updates while the aircraft is in motion.

Since the entire region of the short range buffer is contained within the long range buffer, when data is extracted out to satisfy a given display request, the data can be combined from the two buffers to provide the highest resolution display.

A first method for combining data from two buffers begins by extracting the entire set of radar data out of both buffers. The extracted two sets of radar data overlap up to the boundary of the short range buffer or the requested display range, whichever is less. The radar data from corresponding locations of the two buffers are compared with respect to time, with the newer radar data being chosen. Other merging criteria could be based on ground corruption status, Rain Echo Attenuation Compensation Technique (REACT) bit being set, or for identical time tags, short range data is chosen over long range data. The range beyond the short range buffer, if any, is of course selected from the long range buffer.

A second method, for extracting radar data from the short and long range buffers is to simply extract any radar data from the short range buffer, and at a further range than the short range buffer, extract radar data from the long range buffer. Thus, there is no actual decision criteria (other than range) between the two buffers. This is only possible under select circumstances, such as that based on a designed scan strategy, in which case short range data is at least as fresh as the long range buffer data.

Now that the buffer resolution is established, one can determine the most desirable range bin resolution. The voxel need not be a perfect cube. For example, the x, y, z dimensions of an 80 nm buffer is 0.3×0.3×0.4 nm per voxel, and an 320 nm buffer is 1.00×1.00×1.5 nm per voxel. If one chooses a range bin resolution small enough to guarantee all voxels along the path of the radial are filled, then each range bin can be inserted into the buffer as a rectangular surface rather than a volume. If the radar data of a radial is sampled at a higher resolution than the buffer, then it can be down sampled (using decimation, averaging, median, etc.) to the most desirable range bin resolution before inserting it into the buffer. Conversely, if the radar data of a radial is sampled at a lower resolution, then in one embodiment it is up-sampled before inserting.

Radar Scan Strategy

A scan strategy is developed in order to fill the three-dimensional buffer as quickly as possibly (i.e., using as few antenna sweeps as possible) yet still provide an optimum display. The constraints or limits of a successful scan strategy are buffer update rate; maximum tilt step size; altitude and distance scan above and below the aircraft; maximum antenna scan rate; azimuth range; tilt range; and radar performance.

In one embodiment, because the scan strategy is aircraft altitude dependent, a new scan strategy is generated for every buffer update. A sequence of scan tilt angles is subdivided into three regions. For example, in a first region, the lower insertion beam edge intersects at approximately 10,000 ft below the aircraft and approximately 20 nm from the aircraft. Subsequent scans take a tilt step size of approximately 1.5° until the lower beam edge intersects with earth and about 80 nm from aircraft. In the next region, a tilt step size of approximately 0.5° is used until the lower beam edge intersects with the top of the buffer and about 80 nm from the aircraft. The last region uses a tilt step size of approximately 1.5° until the lower beam edge intersects with the top of the buffer and about 20 nm from the aircraft. An additional scan is added to the sequence where the lower beam edge intersects with the radar horizon. The radar horizon is the point where the entire radar beam just misses hitting on the earth's surface. Once the sequence of tilt angles has been determined, one computes the slant range of the radar beam where the beam hits the earth's surface. The computed slant range value is used to limit the number of range bins for insertion.

Display Capabilities

Figure 8:
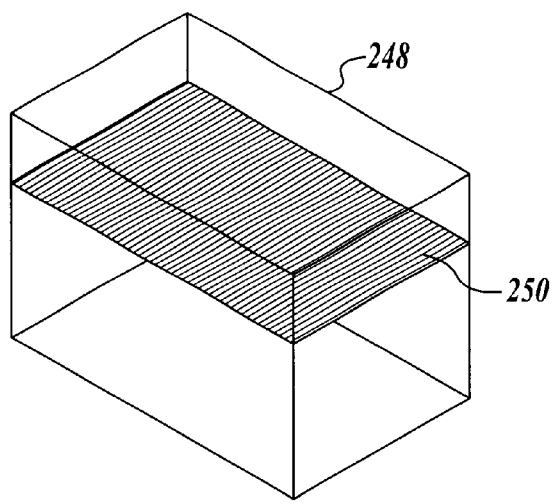
FIGS. 8–10 illustrate various groups of data that can be extracted from the three-dimensional buffer for display on a display device.
Figure 9:
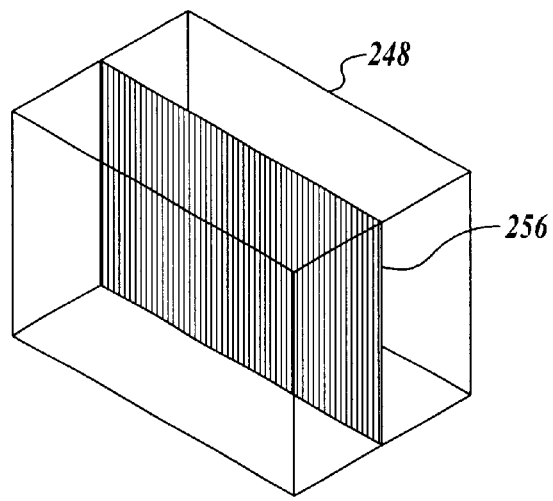
Figure 10:
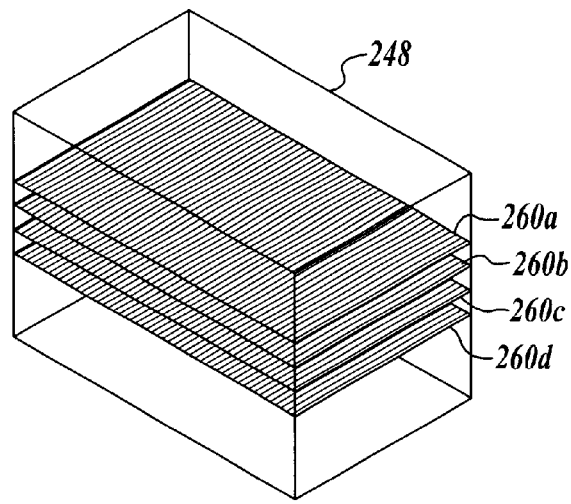

FIGS. 8–10 graphically illustrate two dimensional planes of stored radar data that are extracted from voxels in a three-dimensional buffer 248. The planes or the return data stored in each voxel of the plane are extracted from the three-dimensional buffer 248 by the processor 42 and sent as an image to the display device 44. As shown in FIG. 8, a horizontal plane 250 is extracted by the processor 42 based on an altitude selection and converted into a plan view image for presentation on the display device 44. This assumes that the buffer is stored in the Buffer Coordinate System, where it is referenced to the aircraft initial position in x and y and to the Earth in z. The displayed plan view image shows to the pilot all the radar data available at the selected altitude. The plane of data selected from voxels in the three-dimensional database 248 is selected by the pilot using the user interface 48 or according to a preset parameter. For example, if the pilot was flying at 20,000 feet (ft) and wanted to examine a plan view of radar return data that exists at 25,000 ft, the pilot would simply select 25,000 ft using the user interface 48, thereby directing the processor 42 to select the data assigned to all the voxels associated with 25,000 ft in the three-dimensional buffer 48 at some distance range relative to the aircraft's current position. This selected data is then converted into an image and presented on the display device 44.

As shown in FIG. 9, return data assigned to voxels in a vertical plane 256 is retrieved for display as a result of a desire to present all of the radar return data for showing a vertical profile display extending from the aircraft to some set range distance value. In this example, the processor 42 selects or retrieves the radar data in voxels at a plane beginning at the aircraft's location. The selected plane is preferably parallel to the horizontal direction of travel of the aircraft. The processor 42 generates an image of the selected radar data and displays the image on the display device 44. The displayed image shows the pilot what weather return data exists within a range of altitudes some distance from the aircraft. The altitude range and distance from the aircraft of the plane is determined by a user selection using the user interface 48 or by a presetting.

FIG. 10 illustrates a selection of return data from voxels from a number of planes 260a–d from the three-dimensional buffer 248. If the pilot desires to see in a plan view of the radar return data that is available in a range of altitudes at some range of distance from the aircraft, the processor 42 retrieves all of the radar return data stored in the voxels associated with the volume of space defined by the desired range of altitudes and distances from the aircraft. The retrieved radar return data is then compiled by the processor 42 into a single two-dimensional image that is presented on the display device 44. In this example, if voxels along a single vertical axis (common x, y value in the buffer 248) from the aircraft include different radar return data, only the highest level return data is saved at that x, y position for the to-be-generated two-dimensional image. In one embodiment, the generated plan view image shows the pilot the strongest radar return data in volume of space. Other embodiments may take a weighted average, a median value, or some other linear function of return data, or select return data based on a threshold value.

Figure 11:
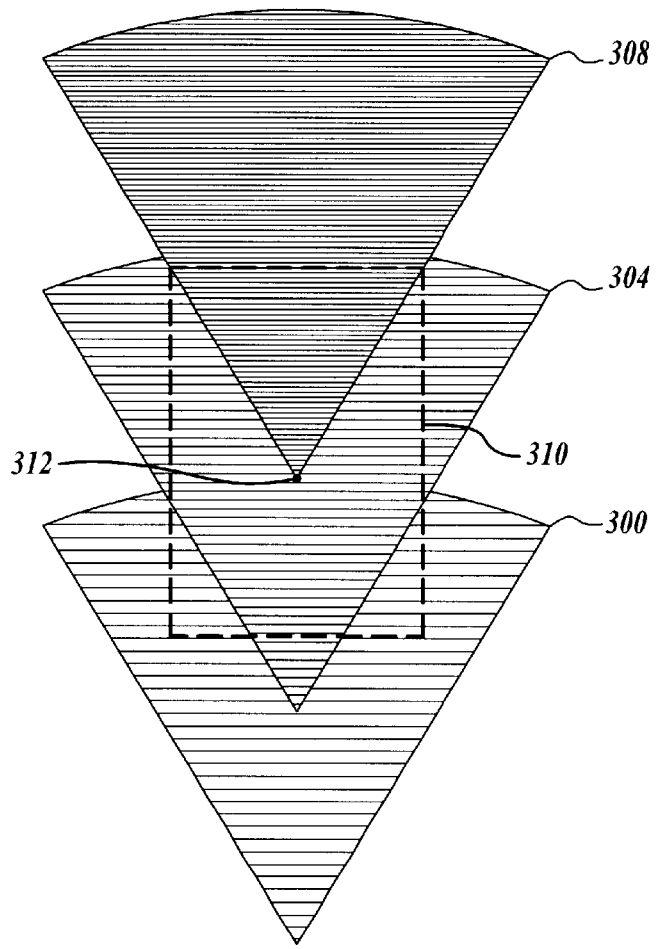
FIG. 11 illustrates return data of a single radar sweep performed over time.

FIG. 11 illustrates a single sweep of radar return data at three different points in time; sweeps 300, 304, and 308. In one embodiment of the present invention, the processor 42 stores radar return data from a present sweep over that of previously stored radar return data. As shown in a two-dimensional representation in FIG. 11, this embodiment results in radar return data 300 and 304 from previous sweeps to be still present in the three-dimensional buffer. Older radar return data in the three-dimensional buffer is typically less reliable than the most recently stored radar return data. Therefore, in this embodiment, the processor 42 time stamps the radar return data that is stored within the three-dimensional buffer. In this example, the stored radar data of each radial of a sweep is stored with the same time stamp. A sweep is motion of the radar antenna between the azimuth stops (e.g., ±90°). Otherwise, if the radar system sweeps vertically, it sweeps from the upper to lower limit of the radar tilt (e.g., ±15°). Because it is important to show the pilot that some of the radar return data is older or not as reliable, the processor 42 generates an image with data from voxels in the three-dimensional buffer differently depending upon their assigned time stamp.

Figure 12:
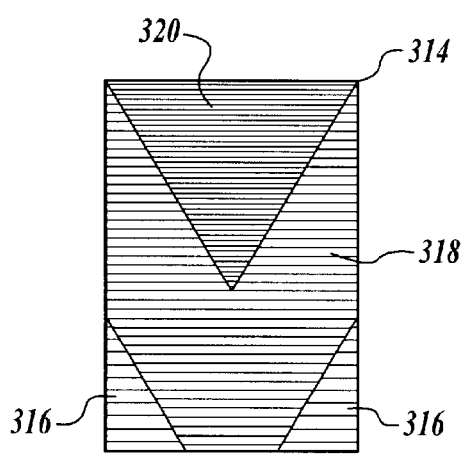
FIG. 12 illustrates how the return data shown in FIG. 11 is displayed on a display device.

For example, FIG. 12 illustrates a generated image 314 taken along the same plane of the buffer as the stored location for the return data of the sweeps 300–308. The image 314 corresponds to a display area 310 relating to the present aircraft location 312. The image 314 visually identifies a difference between radar return data from sweep 300, sweep 304, and sweep 308. In this example, the image 314 will show the region of return data that is around the aircraft. The displayed visual difference is shown in one example by assigning colors to the return data depending upon the time stamp. For example, any radar return data retrieved from the buffer associated with sweep 300 are displayed in blue in sections 316, because section 316 corresponds to buffer locations storing the radar data from sweep 300. Any radar return data within the buffer associated with sweep 304 are displayed in green in section 318 and any radar return data within the buffer associated with sweep 308 are displayed in red in section 320. Other display methods can be used to show differences in the stored data, for example, various outlining or pixel intensity of the radar return data can be used. In other words, intensity values indicate age. The less intense a display object, then the older the stored associated return data. Preferably, the processor 42 compares associated time stamps with threshold values to determine how to display a corresponding display object.

Radar System Tracking Failure

Figure 13:
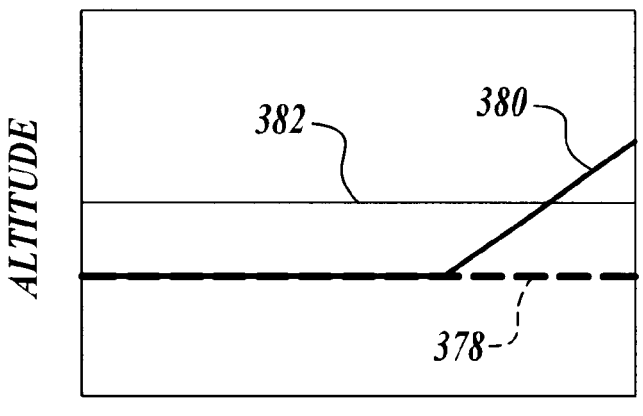
FIG. 13 illustrates the path of a radar antenna with a stabilization failure.
Figure 14:
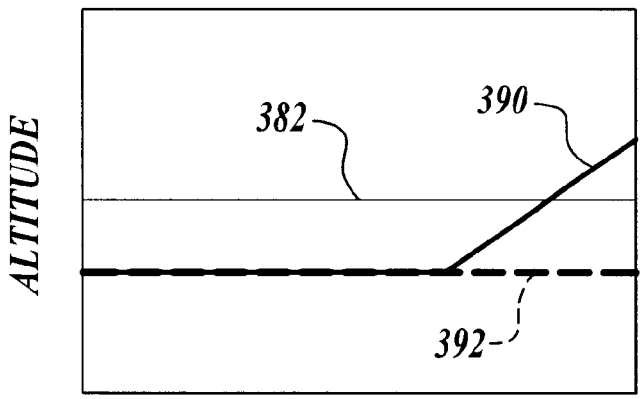
FIG. 14 illustrates how the radar return data produced by the radar path shown in FIG. 13 is stored into the three-dimensional buffer and displayed upon request.

FIG. 13 illustrates an actual azimuth track 380 of radar sweep with a radar stabilization failure or some other radar system tracking failure. The azimuth track 380 does not follow an intended path 378 of the antenna that is supposed to be parallel to the horizon 382. In this embodiment, the processor 42 is informed by the radar system 40 that a stabilization failure has occurred or that just the azimuth tracking of the radar is failing in a certain manner and where this failure occurs. With this information, the processor 42 correctly inserts the radar return data produced at all locations along the track 380 into the proper location in the three-dimensional buffer. As shown in FIG. 14, line 390 shows a two-dimensional view of where the data generated by track 380 is entered into the buffer. Therefore, when a request is made to the processor 42 to present an image along a straight line 392 or plane of voxels, the processor 42 only retrieves the radar return data in the voxels in the three-dimensional buffer associated with the entries along the requested straight line 392. The processor 42 does not extract the radar return data that deviates from that line.

In another embodiment, if the processor 42 senses that the aircraft is in a turn, the processor 42 retrieves return data from locations in the buffer that are in the direction of the turn and displays an image on the display device 44 accordingly. The processor 42 senses that the aircraft is in a turn by interpreting data received from the air data system 46 or by a turn included in a flight plan that is to executed by the pilot or an autopilot. This embodiment allows the flight crew to determine if there exists any weather hazards in the turn direction, so as to avoid completing a turn into an existing weather hazard.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A weather radar display method performed in an aircraft comprising:
    storing radar return data in a three-dimensional buffer according to position of the aircraft, wherein the three-dimensional buffer is referenced to coordinates above the earth;
    extracting at least a portion of the data stored in the three-dimensional buffer according to position of the aircraft; and
    generating a display image of the extracted return data.

2. The method of claim 1, wherein storing comprises storing the radar return data with time information.

3. The method of claim 2, wherein generating an image comprises generating an image according to the stored time information.

4. The method of claim 1, wherein storing comprises storing according to time.

5. The method of claim 4, wherein generating an image comprises:
    generating display objects based on at least one of a first color or intensity, if the time information associated with the return data is within a first pair of threshold values; and
    generating display objects based on at least one of a second color or intensity, if the time information associated with the return data is within a second pair of threshold values.

6. The method of claim 1, wherein generating an image comprises:
    generating display objects based on analyzing and processing of the data stored in the three-dimensional buffer.

7. The method of claim 1, wherein the coordinate system of the three-dimensional buffer is referenced in an x and y direction to aircraft position and in a z direction to altitude above earth.

8. The method of claim 7, wherein storing comprises translating the radar return data into the coordinate system of the three-dimensional buffer.

9. The method of claim 8 wherein storing is further based on atmospheric affects of radar.

10. The method of claim 1, wherein storing is based on actual radar tracking.

11. The method of claim 1, wherein the three-dimensional buffer is a circular buffer.

12. A weather radar display system in an aircraft comprising:
    a database;
    a display; and
    a display processor coupled to the database and the display, the display processor comprises:
        a first component configured to store radar return data in a three-dimensional buffer in the database according to position of the aircraft, wherein the three-dimensional buffer is referenced to coordinates above the earth;
        a second component configured to extract at least a portion of the data stored in the three-dimensional buffer according to position of the aircraft; and
        a third component configured to generate an image of the extracted return data for presentation on the display.

13. The system of claim 12, wherein the first component is configured to store the radar return data with time information.

14. The system of claim 13, wherein the third component is configured to generate an image according to the stored time information.

15. The system of claim 13, wherein the third component comprises:
    a component configured to generate display objects based on at least one of a first color or intensity, if the time information associated with the return data is within a first pair of threshold values, and generate display objects based on at least one of a second color or intensity, if the time information associated with the return data is within a second pair of threshold values.

16. The system of claim 12, wherein the first component is configured to store the radar return data according to time.

17. The system of claim 12, wherein the third component comprises:

a component configured to generating display objects based on analyzing and processing of the data stored in the three-dimensional buffer.

18. The system of claim 12, wherein the coordinate system of the three-dimensional buffer is referenced in an x and y direction to aircraft position and in a z direction to altitude above earth.

19. The system of claim 18, wherein the first component is configured to translate the radar return data into the coordinate system of the three-dimensional buffer.

20. The system of claim 19, wherein the first component is configured to store radar return data based on atmospheric affects of radar.

21. The system of claim 12, wherein the first component is configured to store radar return data based on actual radar tracking.

22. The system of claim 12, wherein the three-dimensional buffer is a circular buffer.

23. A weather radar display computer readable medium for performing a method in an aircraft comprising:
 storing radar return data in a three-dimensional buffer according to position of the aircraft, wherein the three-dimensional buffer is referenced to coordinates above the earth;
 extracting at least a portion of the data stored in the three-dimensional buffer according to position of the aircraft; and
 generating a display image of the extracted return data.

24. The medium of claim 23, wherein storing comprises storing the radar return data with time information.

25. The medium of claim 24, wherein generating an image comprises generating an image according to the stored time information.

26. The medium of claim 23, wherein storing comprises storing according to time.

27. The medium of claim 26, wherein generating an image comprises:
 generating display objects based on at least one of a first color or intensity, if the time information associated with the return data is within a first pair of threshold values; and
 generating display objects based on at least one of a second color or intensity, if the time information associated with the return data is within a second pair of threshold values.

28. The medium of claim 23, wherein generating an image comprises:
 generating display objects based on analyzing and processing of the data stored in the three-dimensional buffer.

29. The medium of claim 23, wherein the coordinate system of the three-dimensional buffer is referenced in an x and y direction to aircraft position and in a z direction to altitude above earth.

30. The medium of claim 29, wherein storing comprises translating the radar return data into the coordinate system of the three-dimensional buffer.

31. The medium of claim 30, wherein storing is further based on atmospheric affects of radar.

32. The medium of claim 23, wherein storing is based on actual radar tracking.

33. The medium of claim 23, wherein the three-dimensional buffer is a circular buffer.

34. A weather radar display method performed in an aircraft comprising:
 storing radar return data in a three dimensional buffer according to position of the aircraft and time, wherein the three-dimensional buffer is referenced to coordinates above the earth;
 extracting at least a portion of the data stored in a three dimension buffer according to position of the aircraft; and
 generating a display image of the extracted return data, wherein generating an image includes:
  generating display objects based on at least one of a first color or intensity, if the time information associated with the return data is within a first pair of threshold values; and
  generating display objects based on at least one of a second color or intensity, if the time information associated within the return data is within a second pair of threshold values.

35. A weather radar display method performed in an aircraft comprising:
 storing radar return data in a three dimensional buffer according to position of the aircraft and according to atmospheric effects of radar, wherein the three-dimensional buffer is referenced to coordinates above the earth; and
 generating a display image of the extracted return data, wherein a coordinate system of the three dimensional buffer is referenced in a X and Y direction to aircraft position and in a Z direction to an altitude above earth, wherein storing includes translating the radar return data into the coordinate system of the three dimensional buffer.

* * * * *